(12) United States Patent
Batinich et al.

(10) Patent No.: US 9,563,490 B1
(45) Date of Patent: Feb. 7, 2017

(54) ADAPTIVE INTEGRATION FLOW USING AUTOMATED SERVICE DISCOVERY

(71) Applicant: International Business Machines Corporation, Armonk, NY (US)

(72) Inventors: Mark D. Batinich, North Aurora, IL (US); Linwood E. Loving, Mechanicsville, VA (US); Luigi Pichetti, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/883,784

(22) Filed: Oct. 15, 2015

(51) Int. Cl.
   *G06F 9/54* (2006.01)
   *G06F 9/445* (2006.01)

(52) U.S. Cl.
   CPC ........... *G06F 9/543* (2013.01); *G06F 9/44505* (2013.01)

(58) Field of Classification Search
   None
   See application file for complete search history.

(56) References Cited

U.S. PATENT DOCUMENTS

| | | | |
|---|---|---|---|
| 5,774,725 A * | 6/1998 | Yadav | G06F 11/3696 714/E11.208 |
| 6,256,664 B1 | 7/2001 | Donoho et al. | |
| 8,370,400 B2 | 2/2013 | Brunswig et al. | |
| 2002/0100017 A1 * | 7/2002 | Grier | G06F 8/54 717/120 |
| 2005/0066338 A1 | 3/2005 | Bloesch et al. | |
| 2005/0166115 A1 * | 7/2005 | Daume | G06F 11/3414 714/741 |
| 2006/0200486 A1 * | 9/2006 | Castro | G06F 17/30342 |
| 2011/0173590 A1 | 7/2011 | Yanes | |

OTHER PUBLICATIONS

Sabbouh, M. et al.; Hiding distributed complexities: attribute based programming, 1998.
IBM; Extending the MOF meta-model to support definition of mappings between models, Jan. 20, 2005.
Internet Society RFCs et al.; A Common API for Transparent Hybrid Multicast, Dec. 17, 2013.
IBM Endpoint Manager, The Scope of Relevance, Version 9.0, 2013.

* cited by examiner

*Primary Examiner* — Shih-Wei Kraft
(74) *Attorney, Agent, or Firm* — Garg Law Firm, PLLC; Rakesh Garg; Christopher K. McLane

(57) ABSTRACT

For systems integration, an information published about an application programming interface (API) of a service is parsed to extract a pattern from the information. the pattern is compared with a stored pattern in a repository, wherein the stored pattern corresponds to a known API. When the pattern matches the stored pattern within a threshold degree of match, a conclusion is made that the API of the service is the known API. A collector code module is selected where the collector code module is configured to call the known API. The collector code module is sequenced in an integration sequence, to call the known API. A forwarder code module is also sequence din the integration sequence to forward a data output of the service to a consumer application.

12 Claims, 7 Drawing Sheets

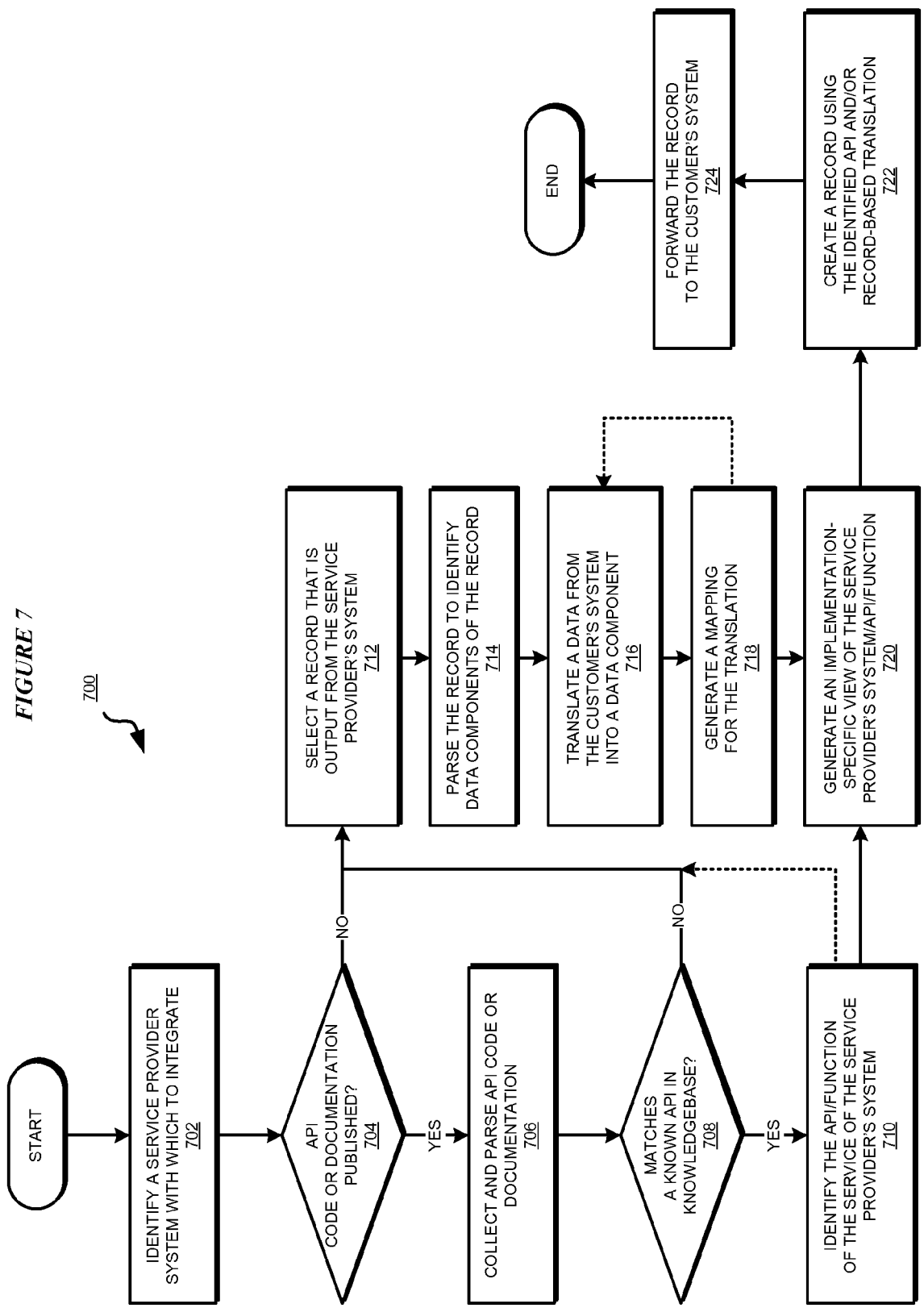

ADAPTIVE INTEGRATION FLOW USING AUTOMATED SERVICE DISCOVERY

TECHNICAL FIELD

The present invention relates generally to a method, system, and computer program product for integrating various applications to operate together in providing a function. More particularly, the present invention relates to a method, system, and computer program product for adaptive integration flow using automated service discovery.

BACKGROUND

A customer, such as a business entity, operates their data processing systems and the applications therein to provide certain features and functions to their users. In providing such functions, the customer's system generates data, consume data, and use services provided by other systems and applications.

For example, a service provider to a customer may furnish systems and applications that provide a specialized functionality. A customer's system interfaces with a service provider's system to utilize that specialized functionality in the course of providing the customer's features and function to the customer's users.

System integration is the process of enabling a customer's system to utilize a service provider's system towards this end. Often, technologists with in depth knowledge of the customer's system and the service provider's system are tasked with coding and implementing components that enable the system integration.

In a typical customer's data processing environment, it is not uncommon to see dozens of service provider systems from different service providers providing different specialized functionalities or services. Furthermore, it is also not uncommon to find different customers implementing their features and functions differently, creating data differently, and consuming data differently from a model used by a service provider.

To accommodate these variations in customer environments, many service providers implement their functionalities or services in such a way that they can be customized according to a customer's unique needs. The variability in customer environments, the numerosity of service providers, and the variety of customizations of the functionalities or services make the integration a custom implementation at each customer. Not only this, but the variety of skills and deep knowledge of each environment, customer data and functions, and services and functionalities available from various service providers require an ever-changing set of skills and knowledge that have to be brought together for each integration solution.

SUMMARY

The illustrative embodiments provide a method, system, and computer program product for adaptive integration flow using automated service discovery. An embodiment includes a method for systems integration. The embodiment parses an information published about an application programming interface (API) of a service to extract a pattern from the information. The embodiment compares the pattern with a stored pattern in a repository, wherein the stored pattern corresponds to a known API. The embodiment concludes, responsive to the pattern matching the stored pattern within a threshold degree of match, that the API of the service is the known API. The embodiment selects a collector code module, the collector code module being configured to call the known API. The embodiment sequences, in an integration sequence, the collector code module to call the known API, and a forwarder code module to forward a data output of the service to a consumer application.

Another embodiment includes a computer program product for systems integration, the computer program product comprising one or more computer-readable storage devices, and program instructions stored on at least one of the one or more storage devices.

Another embodiment includes a computer system for systems integration, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 7 depicts a flowchart of an example process for adaptive integration flow using automated service discovery in accordance with an illustrative embodiment.

DETAILED DESCRIPTION

Figure 1:
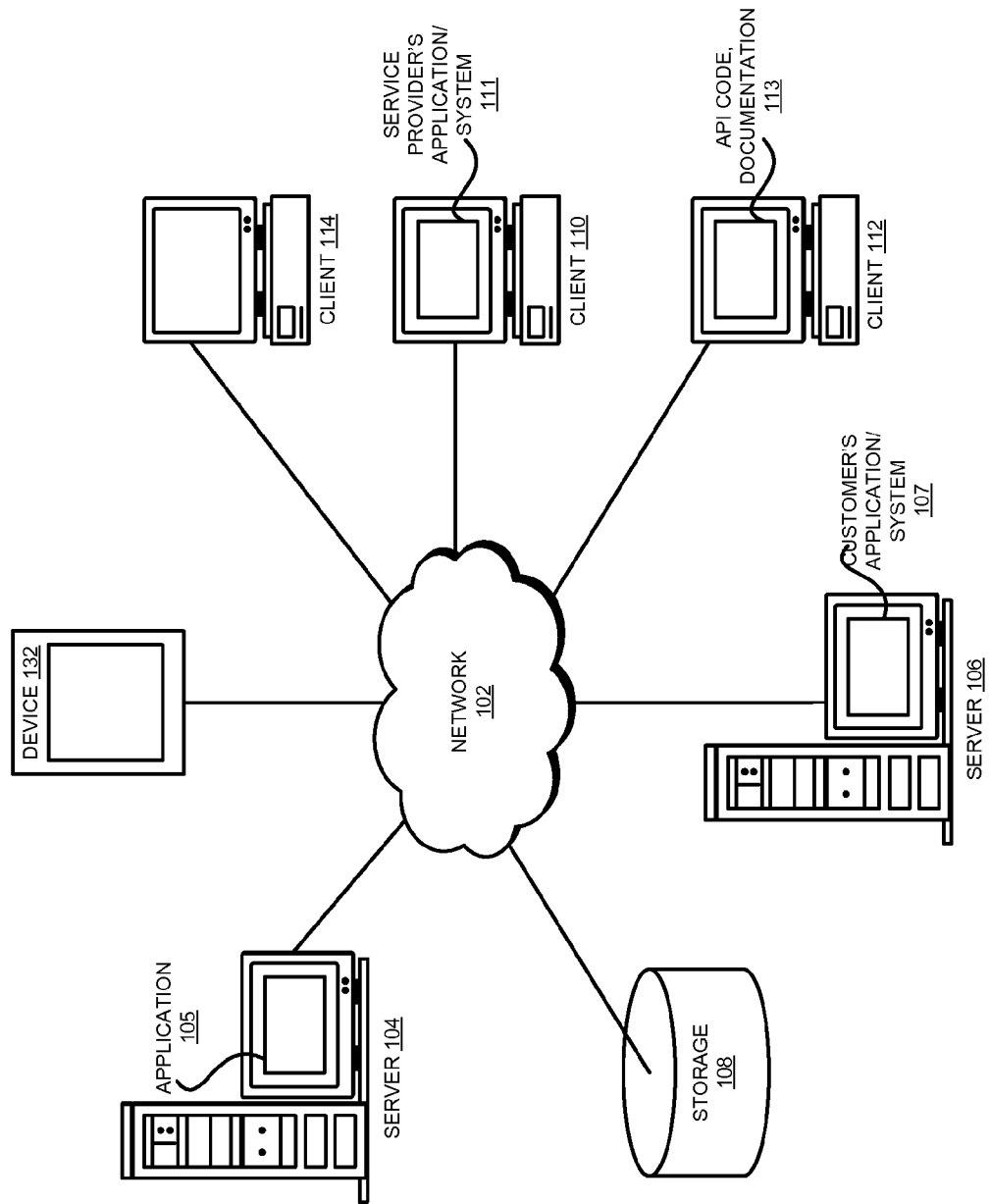
FIG. 1 depicts a block diagram of a network of data processing systems in which illustrative embodiments may be implemented.

A functionality provided by a service provider system is generally usable by calling an application programming interface (API) of an application that implements the functionality. An API is code-based tool or method, such as a function call in a programming language, using which the functionality can be activated or operated.

A service provider system includes hardware and software components, either of which is operable using one or more API. In its most common form, an API is a function call, which accepts a set of zero or more input parameters. A function or method invoked by calling an API performs a corresponding functionality. The operation of a function or method can result in data manipulation, data output, or both.

When the functionality is implemented in a function or method of an application in a service provider system, the data manipulation or data output, as the case may be, is to be performed in a customer system with which the service provider system has to be integrated. This integration has to call the correct API of the correct application with correct parameters, to produce data that is consumable in the customer system.

Presently, the integration is accomplished via custom code, implemented on a case-by-case basis using skills and knowledge of both systems. The illustrative embodiments recognize that the presently used method for integrating a service provider system with a customer system is expensive, time intensive, and generally non-reusable in other integrations. Furthermore, such a custom integration often turns out to be version and functionality-specific, which requires continued expense and involvement of skilled individuals for scaling and migration.

The illustrative embodiments used to describe the invention generally address and solve the above-described problems and other problems related to systems integration. The illustrative embodiments provide a method, system, and computer program product for adaptive integration flow using automated service discovery.

An embodiment executes as an application in, or in conjunction with, a data processing system used for integrating a customer system with a service provider system. Hereinafter, a service provider functionality is referred to as a service without implying any limitation of providing such functionality only in the form of a service.

Furthermore, the various embodiments are described using an example of a trouble ticket generation service provided by a service provider system in the course of providing service management functionality. The ticket generation service example is not intended to be limiting. From this disclosure, those of ordinary skill in the art will be able to conceive many other services that can be used with an embodiment and the same are contemplated within the scope of the illustrative embodiments.

An embodiment recognizes that some service providers publish information about their API library. An API library includes one or more APIs supported by the service provider.

In some cases, the published information can take the form of published code of the API, such as the specific function to call, the specific set of parameters to provide, the specific data output to expect, and the like.

In some other cases, the published information can take the form of textual documentation of a function accessible via an API. Such textual documentation may not include the code of the API but a general description of a functionality offered by the service provider.

In some cases, a service provider may implement an API that allows an external system, such as an integration system to query the service provider system for information about the available APIs. Such APIs are referred to as discovery APIs. When a discovery API is available, the published information can be minimal—about the discovery API—leaving the remainder of the information to be discovered by calling the discovery API.

In some cases, the APIs and the functionality offered by a service provider may be in a black-box form. In other words, no published information—whether code, text, or a discovery API—might be available about any or some APIs and/or functionalities.

An objective of an embodiment is to be able to call an API of a service on behalf of a customer system, obtain a data output (hereinafter referred to as a record) from the service, and forward that record to the customer system. This objective requires an analysis of the API based on discovery or published information about the APIs of the service provider system.

When discovery or published information about an API is unavailable or unusable for any reasons, another objective of an embodiment is to be able to emulate a record that would be produced by the service that would be invoked by the API. The emulated record is then forwarded to the customer system. This objective requires an analysis of the record and transforming customer's data into the data components of the record. The record can be analyzed by analyzing a sample record or a record previously produced by the service.

When published information is available about an API, an embodiment obtains the published information, such as from a repository accessible from the service provider system. The embodiment parses the information pertaining to the service of interest.

By parsing the textual information, the embodiment extracts a text string or pattern from the information. The embodiment matches the textual pattern with patterns of known APIs stored in a repository. For example, a common service, for which customers integrate a service provider system, is a ticket generation service. The service collects information from a customer system and generates a license management ticket, a hardware trouble ticket, a software event ticket, or other similarly purposed tickets. Essentially, a ticket is a record of an event, where the record is produced in a form that is suitable for consumption by another customer application for resolution.

Several service provider systems provide a ticket generation service, an API therefor, and sometimes published information about the API. A repository of known APIs collects patterns from such published information from the various service providers about a service, such as the ticket generation service in the above example.

An embodiment attempts to match a pattern extracted from a given published information about a service with patterns associated with known APIs of various service providers for the service. If an extracted pattern matches a pattern of a known API in the repository, within a threshold degree of match—the embodiment concludes that the API being used in the particular integration is the known API associated with the pattern in the repository.

When code of an API is available through documentation or discovery, another embodiment obtains the code, such as from a library or repository accessible from the service provider system. The embodiment parses the code of the API.

By parsing the code of the API, the embodiment extracts a portion of the code—a code pattern—from the code. The embodiment matches, within a threshold degree of match, the code pattern with the code patterns of known APIs stored in a repository. Just as a repository stores text patterns associated with known APIs, the repository also includes code patterns of known APIs when possible. If a code pattern matches a code pattern of a known API in the repository, the embodiment concludes that the API being used in the particular integration is the known API associated with the code pattern in the repository.

Data output of a service is used by an embodiment in at least two circumstances. In the first circumstance, textual or code information may not be available about an API of the service. Under such a circumstance, an embodiment parses the data output record of the service to identify the various data components of the record.

An embodiment matches a data component of the record with a data item available in the customer's data in the customer's system. As a non-limiting example, a data component can be identified in the record by an associated name, label, or other similarly purposed construct, which is also available in the record. For example, a twelve character alphanumeric data component in the record may be identified as a "ticket identifier" according to the associated label. The embodiment determines, using a lexicon, a knowledgebase, or a translation table, that a "ticket identifier" is used for the same purpose as an "incident number" in the customer system, which is a four digit number in the customer system. Therefore, the embodiment concludes that the ticket identifier data component of the record is a translation of the incident number data in the customer system.

The example of label-based matching described above is not intended to be limiting on the illustrative embodiments. Generally, an embodiment can determine a correspondence between a data component of a record and a data item in the customer system using any suitable method. For example, a position of a data component in a record can also identify a role of the data component, enabling an embodiment to perform a role based mapping or translation to the customer's data.

Similarly, one data component in a record can give a specific meaning to another data component in the record, enabling the embodiment to perform a meaning-based mapping or translation to the customer's data. From this disclosure, those of ordinary skill in the art will be able to conceive many other manners of determining a correspondence between a data component of a record and a data item in the customer system, and the same are contemplated within the scope of the illustrative embodiments.

By identifying the data components of the record with the customer's data, an embodiment is able to emulate the record generation process of the service without knowing the details about the API of the service. The embodiment collects the customer's data that corresponds to the various data components, and produces a record as if the record was produced from the service. The embodiment forwards the emulated record to the customer system for consumption by an application in the customer's environment.

In a second circumstance, the data output record of the service is used to determine a customized or variation view of the service that has been customized for deployment in the customer's environment. For example, the same service from the same service provider is often customized differently to produce different records with different data components, when deployed in different customers' environments. By parsing a particular sample record or a past record from a particular customer's environment, an embodiment learns how the record has been customized for the particular customer.

One embodiment uses the information about the variation to adjust an identified API, if the embodiment was able to identify the API in a manner described herein. For example, the variation may indicate that one of the parameters of the API call is not used in the record at all. The embodiment can then modify the API call to include a null value in that omitted parameter. As another example, the variation may indicate that an additional parameter is converted into a custom data component in the record resulting from the API call. The embodiment can then modify the API call to supply the additional parameter from the customer's data.

These examples of API modifications and reasons therefor are not intended to be limiting. From this disclosure, those of ordinary skill in the art will be able to conceive many other ways of modifying an identified API, and the same are contemplated within the scope of the illustrative embodiments.

Once an embodiment has identified the API, modified the API, determined the data transformations used in a record, or some combination thereof, the embodiment prepares a sequence of operations. The sequence of operations forms all or a part of an automatic integration system between the customer system and the service provider system. In some cases, such an integration system may be configured to reside within the customer's system.

For example, in one embodiment, the sequence of operations collects information about an API from discovery, determines a view of the service that is deployed at the customer, identifies the transformations utilized in a record produced from the service, and a manner of forwarding the record to a repository in the customer's environment. In another embodiment, the sequence of operations collects information about an API from published documentation, determines a view of the service that is deployed at the customer by parsing a different sample record produced from a service, identifies the transformations utilized in the different record, and a different manner of forwarding the different record to an application in the customer's environment.

As can be seen from these non-limiting example sequences of operations, integrating with different APIs can create different sequences of operations. Furthermore, the operations in these different sequences can be different from one another. For example, each operation in this example sequence of operations is a code module. A code module of an operation may itself have external APIs using which an API of a service may be called. Similarly, a code module of an operation may have internal APIs which are called by other code within the module, or by other code modules of other operations.

Furthermore, a code module may be configurable. Therefore, a code module may also include APIs usable for configuring the code module for operating in a particular manner. Different versions of a code module may be constructed to perform variations of a common operation, such as under differing circumstances in a customer system, or in different customer systems.

An embodiment creates a set of sequences of operations by selecting and configuring specific code modules for determining the service interface with which the customer system is to be integrated. When the sequence of the selected code modules is executed as an application according to an embodiment, the application automatically resolves an API of a service, a record produced from the service, or both, in the given customer environment. Thus, the integration task becomes far less dependent upon the specialized knowledge of the service provider system and the customer system, as compared to a presently used integration system. The integration system also becomes much more configurable, scalable, and changeable as either system evolves, as compared to a presently used integration system.

A method of an embodiment described herein, when implemented to execute on a device or data processing system, comprises substantial advancement of the functionality of that device or data processing system for adaptive integration flow using automated service discovery. For example, prior-art method of service integration requires custom integration code for each integration, and also requires highly specialized skill and knowledge of the systems being integrated. An embodiment automates the process of revealing the APIs, understanding the customized view of a service in a given environment, determines how the service transforms a customer's data into a data output of the service, and configures a suitable manner of forwarding the service outputs to the appropriate consumers in the customer's environment. Such manner of adaptive integration flow using automated service discovery is unavailable in presently available devices or data processing systems. Thus, a substantial advancement of such devices or data processing systems by executing a method of an embodiment is in reducing the time and effort of integration, reducing the level of skill and knowledge needed for the integration, improvement in the re-usability and reproducibility of the integration solution, and improved scalability for future systems evolution.

The illustrative embodiments are described with respect to certain systems, services, APIs, parameters, records, data components, transformations, forwarding methods, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
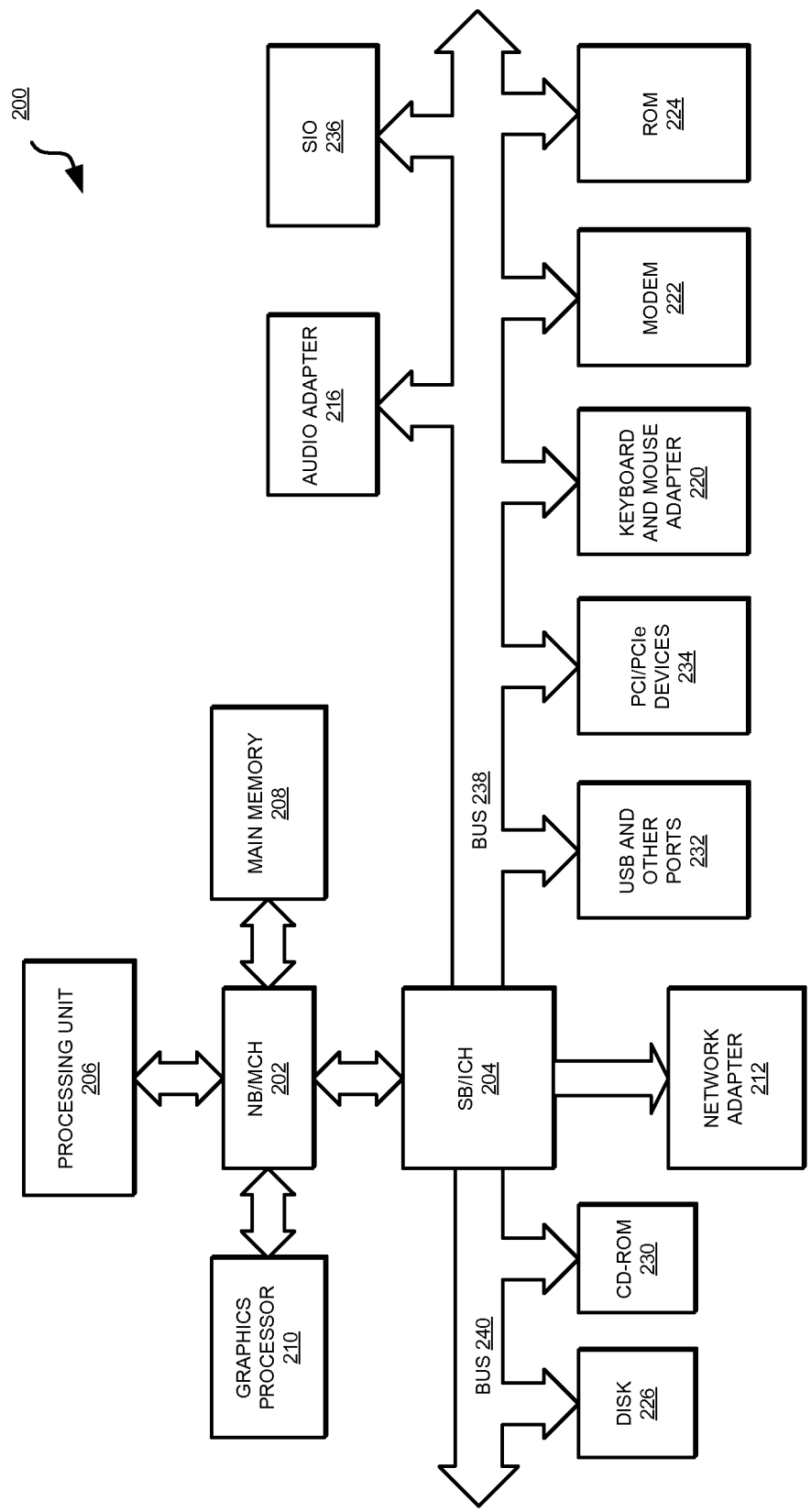
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Server 104 can be a service integration system or may be usable for executing a customer application. Server 106 executes customer system 107, which may be an application on the customer-side. Client 110 operates service provider system 111, which provides one or more services to customer system 107 via integration system 104. API code or documentation 113 is code or documentation related to an API, and is available from client 112, which is accessible from service provider system 111.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
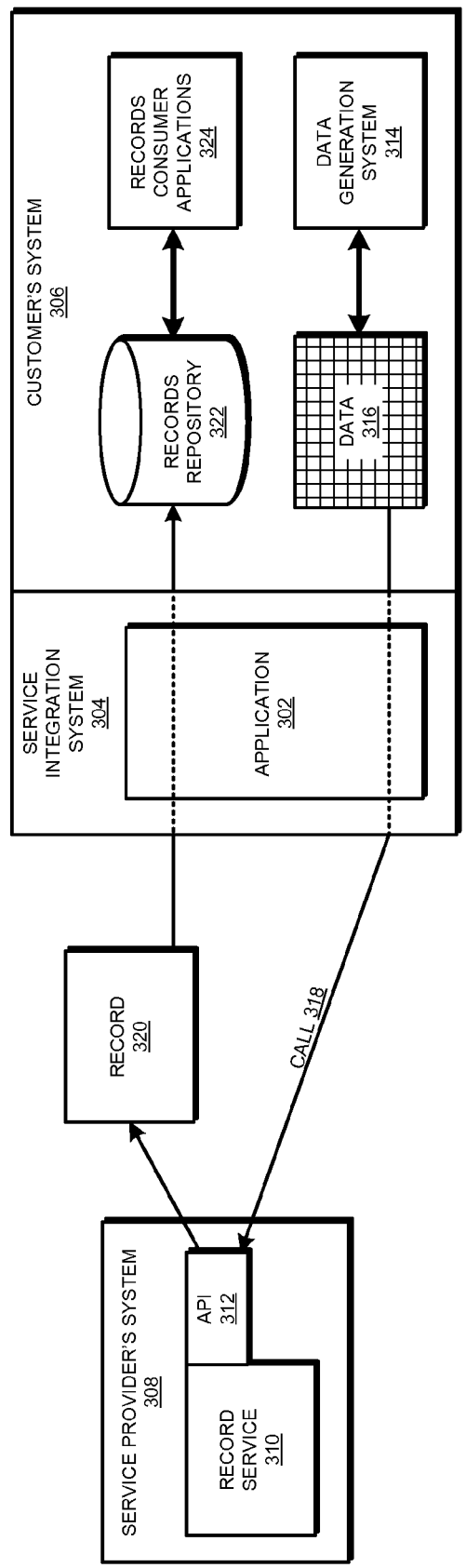
FIG. 3 depicts a block diagram of an example configuration for adaptive integration flow using automated service discovery in accordance with an illustrative embodiment.

With reference to FIG. 3, this figure depicts a block diagram of an example configuration for adaptive integration flow using automated service discovery in accordance with an illustrative embodiment. Application 302 is an example of application 105 in FIG. 1.

Application 302 executes in service integration system 304, which is an example of server 104 in FIG. 1. Customer system 306 is an example of customer system 107 in FIG. 1. Service provider system 308 is an example of service provider system 111 in FIG. 1.

Only as a non-limiting example to illustrate and describe an operation of an embodiment, consider that service provider system 308 provides a ticket generation functionality via record service 310. Record service 310 can be invoked using API 312 in service provider system 308.

Data generation system 314 in customer system 306 produces customer data 316. An integration between customer system 306 and service provider system 308 via application 302 is to be configured such that application 302 calls (318) API 312. The call to API 312 results in record service 310 producing data output in the form of record 320.

Application 302 parses record 320 to identify data components in record 320, and create data transformations as described elsewhere in this disclosure. Application 302 forwards record 320 or an emulation thereof to records repository 322. One or more records consuming applications 324 consume a record stored in repository 322.

Figure 4:
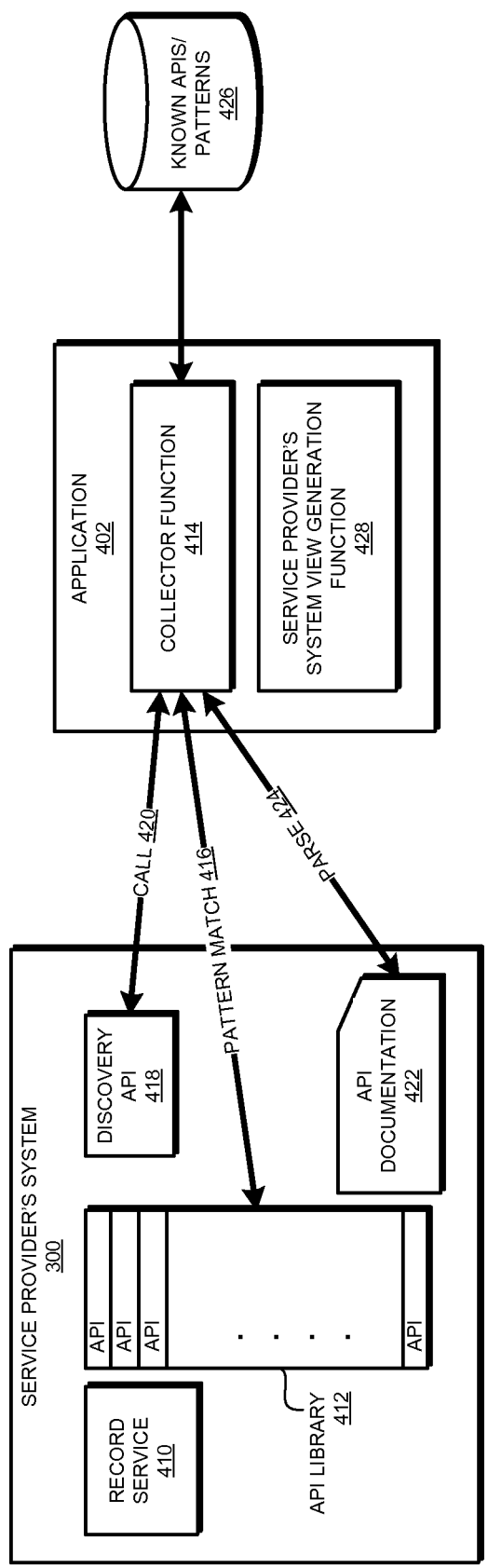
FIG. 4 depicts a block diagram of an example process for adaptive integration flow using automated service discovery in accordance with an illustrative embodiment.

With reference to FIG. 4, this figure depicts a block diagram of an example process for adaptive integration flow using automated service discovery in accordance with an illustrative embodiment. Application 402 is an example of application 302 in FIG. 3. Service provider system 408 is an example of service provider system 308 in FIG. 3. Record service 410 is an example of record service 310 in FIG. 3.

Assume, as one example, that service provider system 408 includes API library 412. API library 412 includes any number of APIs supported in service provider system 408. Collector function 414 in application 402 is a code module that can be sequenced in the manner described herein. When APIs in API library 412 can be identified, collector function 414 extracts a code pattern from an API's code to perform code pattern matching 416, as described herein.

Assume, as another example, that service provider system 408 includes discovery API 418. Discovery API 418 allows a calling function to discover the APIs supported in service provider system 408. When discovery API 418 is available, collector function 414 calls (420) discovery API 418 to discover the code of one or more APIs supported in service provider system 408. Collector function 414 then parses the discovered code of an API to extract a code pattern and perform code pattern matching, as described herein.

Assume, as another example, that service provider system 408 includes discovery API documentation 422. API documentation 422 provides published textual information about an API supported in service provider system 408. When API documentation 422 is available, collector function 414 parses (424) API documentation 422 to extract a textual description of one or more APIs supported in service provider system 408. Collector function 414 then performs a text pattern matching, as described herein.

Using the code patter or the text pattern, as the case may be, collector function determines whether the extracted patter matches a pattern of a known API in repository 426. If the extracted pattern matches a pattern in repository 426 within a threshold degree of match, collector function 414 identifies the API being used in service provider system 408 in the particular implementation as the matching API in repository 426.

In some cases, whether service provider system 408, record service 410, the API, or some combination thereof has been modified in the given implementation can also be determined from the pattern matching process. Component 428 is another example of a code module that can be sequenced in a manner described herein. For example, component 428 generates a view of service provider system 408, record service 410, the API, or a combination thereof, based on the differences between the extracted pattern and a matching pattern from repository 426. For example, if repository 426 stores patterns related to a standard form of an API, and the extracted pattern matches within the threshold degree but contains certain differences from a standard pattern, component 428 attributes those differences to a view, i.e., a variation in the particular implementation of service provider system 408.

As another example, suppose that repository 426 stores multiple patterns related to multiple variations of a standard form of an API. If component 428 determines that the extracted pattern matches the pattern of a particular variation the most, component 428 concludes that the particular implementation of service provider system 408 employs that variation or view as well.

Figure 5:
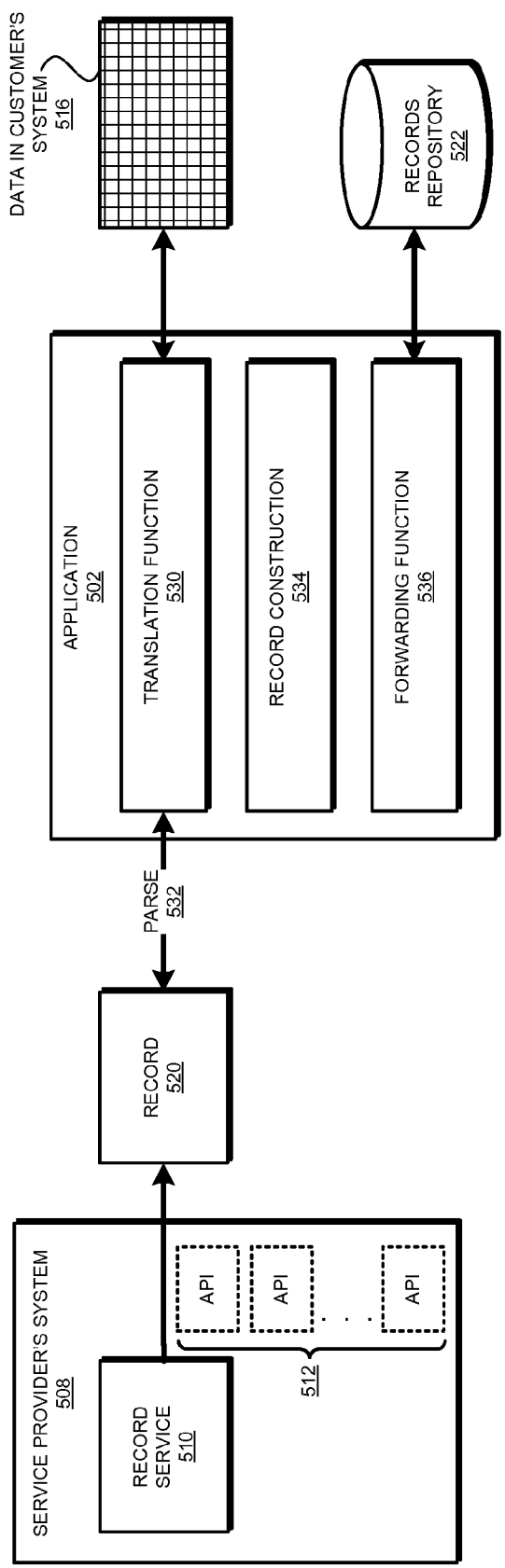
FIG. 5 depicts a block diagram of another example configuration for adaptive integration flow using automated service discovery in accordance with an illustrative embodiment.

With reference to FIG. 5, this figure depicts a block diagram of another example configuration for adaptive integration flow using automated service discovery in accordance with an illustrative embodiment. Application 502 is an example of application 302 in FIG. 3. Service provider system 508 is an example of service provider system 308 in FIG. 3. APIs 512 are examples of API 312 in FIG. 3. Data 516 in customer's system is an example of data 316 in FIG. 3. Record 520 is an example of record 320 in FIG. 3. Records repository 522 is an example of records repository 322 in FIG. 3.

As another example, suppose that service provider system 508 does not provide information about the APIs supported therein, or that such information is unusable for some reason, or that regardless of the API information availability record 520 generated from service 510 has to be analyzed. Translation function 530 is another code module that can be sequenced in the manner described herein. Translation function 530 parses (532) record 520 to identify the data components of record 520.

Translation function 530 uses data 516 to determine a translation, transformation, or mapping, which when applied to a data item in data 516 would generate a corresponding data component of record 520. Some non-limiting examples of such transformations have been described elsewhere in this disclosure.

Record construction function 534 is another code module that can be sequenced in the manner described herein. When an API cannot be successfully identified to produce record 520 from service 510, record construction function 534 emulates record 520. Particularly, record construction function 534 uses a transformation produced by translation function 530 on a data item from data 516 to produce a data component of record 520.

Forwarding function 536 forwards record 520, or an emulated record produced from component 534, to a suitable destination in the customer's system. For example, forwarding function 536 sends, transmits, stores, saves, or otherwise provides or forwards the record to records repository 522 in the customer's system.

Figure 6:
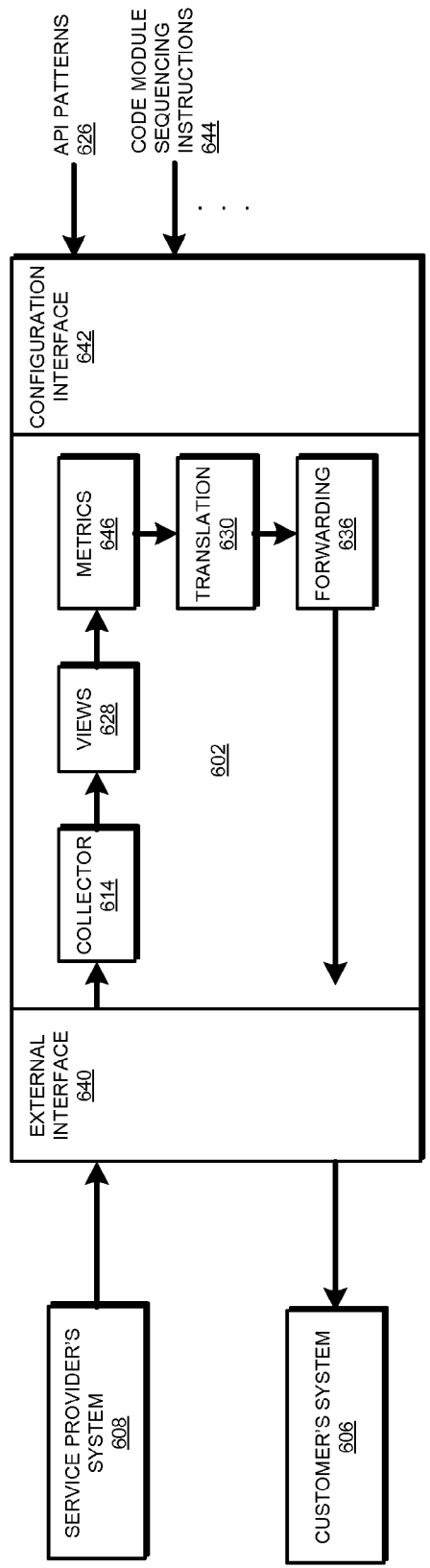
FIG. 6 depicts a block diagram of an example sequence of code modules in accordance with an illustrative embodiment.

With reference to FIG. 6, this figure depicts a block diagram of an example sequence of code modules in accordance with an illustrative embodiment. Application 602 is an example of application 302 in FIG. 3, application 402 in FIG. 4, or application 502 in FIG. 5. Customer system 606 is an example of customer system 306 in FIG. 3. Service provider system 608 is an example of service provider system 306 in FIG. 3.

External interface 640 allows application 602 to communicate with external systems, such as with service provider system 608 and customer system 606. Configuration interface 642 allows application 602 to accept API patterns 626, code module sequencing instructions 646, and other commands to configure application 602.

Some example code modules are depicted in an example sequence in application 602. Collector code module 614 implements collector function 414 of FIG. 4. Views code module 628 implements view generation function 428 in FIG. 4.

Metrics code module 646 is a code module configured to measure a metric associated with integration facility provided by application 602. For example, one metric code module may measure an accuracy rate of API identification. As another example, another metric code module may measure a completeness of an emulated record. Any number of metric code modules 646 can be constructed to measure any number and types of metrics associated with an integration operation, and the same are contemplated within the scope of the illustrative embodiments. Furthermore, any number of metric code module 646 and other code modules can be sequenced in application 602 in this manner.

Translation code module 630 implements translation function 530 in FIG. 5. Forwarding code module 636 implements forwarding function 536 in FIG. 5.

The example code modules depicted in this figure are not intended to be limiting. From this disclosure, those of ordinary skill in the art will be able to construct these and other code modules in other ways, and such adaptations are contemplated within the scope of the illustrative embodiments. The example sequence of code modules depicted in this figure is not intended to be limiting. From this disclosure, those of ordinary skill in the art will be able to construct many other sequences of varying complexities using these and other code modules in other ways, and such adaptations are contemplated within the scope of the illustrative embodiments.

With reference to FIG. 7, this figure depicts a flowchart of an example process for adaptive integration flow using automated service discovery in accordance with an illustrative embodiment. Process 700 can be implemented in application 602 in FIG. 6.

The application identifies a service provider system with which to integrate a customer system (block 702). The application determines whether the API code or documentation is available and usable (block 704).

If API code, documentation, or both, are available ("Yes" path of block 704), the application collects and parses, such as by using a collector code module, the code, documentation, or both (block 706). The application determines whether a pattern extracted from the parsing matches a pattern of a known API in an API knowledgebase, such as in a repository of known API patterns (block 708).

If the pattern matches a pattern of a known API within a threshold degree of match ("Yes" path of block 710), the application identifies the API of the service provider system as the API whose pattern matched in the API knowledgebase (block 712). As described elsewhere in this disclosure, in some cases, the application may have sufficient information from the matching process to identify a view of the service provider system that is deployed in the particular implementation. In such cases, the application proceeds to block 720.

If the API code or documentation us unavailable or unusable ("No" path of block 704), or if the extracted pattern does not match any known API patterns ("No" path of block 708), the application selects a record that is output from the service provider system (block 712). As described elsewhere in this disclosure, in some cases, the application may not have sufficient information from the matching process to identify a view of the service provider system that is deployed in the particular implementation. In such cases, the application proceeds to block 712 as well to identify the view via parsing a sample record.

The application parses the record to identify the data components of the record (block 714). The application translates or transforms a data item from the customer system into a data component of the record (block 716). The application produces a mapping of the translation or transformation (block 718). Block 716 and 718 can be repeated for as many data components as may have to be created through similar translations.

The application uses the mapping to identify an implementation-specific view of the service provider system, service provider system's service, service provider system's API, or some combination thereof (block 720). The application obtains a record using the identified API, or creates a record using the translation mappings (block 722). The application forwards the record of block 722 to the customer system (block 724). The application ends process 700 thereafter.

Thus, a computer implemented method, system or apparatus, and computer program product are provided in the illustrative embodiments for adaptive integration flow using automated service discovery. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for systems integration, the method comprising:
    parsing an information published about an application programming interface (API) of a service to extract a pattern from the information;
    comparing the pattern with a stored pattern in a repository, wherein the stored pattern corresponds to a known API;
    concluding, responsive to the pattern matching the stored pattern within a threshold degree of match, that the API of the service is the known API;
    selecting a collector code module, the collector code module being configured to call the known API;

sequencing, in an integration sequence, the collector code module to call the known API, and a forwarder code module to forward a data output of the service to a consumer application;

determining that a second information about a second API of a second service is unavailable to identify the second API;

obtaining a previously produced data output of the second service;

parsing the previously produced data output to identify a data component;

determining a transformation that is applied to a data item to obtain the data component, the data item being stored in a system that is integrated with the service;

creating, according to the transformation, a mapping between the data item and the data component, such that the mapping when applied to the data item results in the data component;

applying the mapping to an actual data item to obtain an actual data component of an actual data output of the second service;

emulating the actual data output of the second service using the actual data component;

forwarding the emulated actual data output to the consumer application;

sequencing, in a second integration sequence, the collector code module to parse the previously produced data output, a transformation code module to generate the mapping, and the forwarder code module to forward an emulated actual data output to the consumer application;

determining that the pattern matches a version of the stored pattern, wherein the repository stores a plurality of versions of the stored pattern, wherein different versions of the stored pattern in the plurality of versions correspond to different implementations of the known API; and further concluding that the API of the service is a particular implementation of the known API, the particular implementation of the known API corresponding to the version of the matching stored pattern.

2. The method of claim 1, further comprising: determining that the data component is generated due to a variation in the service from a standard service; and further concluding that the service is a particular implementation of the standard service; and using the variation in the service to produce the emulated actual data output.

3. The method of claim 1, further comprising:
sequencing, in the integration sequence, a metric code module to compute a performance metric, wherein the performance metric represents an accuracy in identifying the API of the service.

4. The method of claim 1, wherein the repository comprises a set of stored patterns, each stored pattern corresponding to an API that is known from a previous system integration.

5. The method of claim 1, wherein the information comprises a code of the API of the service, and wherein the pattern is a pattern in the code.

6. The method of claim 5, further comprising: calling a discovery API to discover a set of APIs, the set of APIs including the API of the service, wherein the discovery API returns the code of the API of the service.

7. The method of claim 1, wherein the information comprises a textual description of the API of the service, and wherein the pattern is a text pattern in the textual description.

8. A computer program product for systems integration, the computer program product comprising one or more computer-readable storage devices, and program instructions stored on at least one of the one or more storage devices, the stored program instructions comprising:

program instructions to parse an information published about an application programming interface (API) of a service to extract a pattern from the information;

program instructions to compare the pattern with a stored pattern in a repository, wherein the stored pattern corresponds to a known API;

program instructions to conclude, responsive to the pattern matching the stored pattern within a threshold degree of match, that the API of the service is the known API;

program instructions to select a collector code module, the collector code module being configured to call the known API;

program instructions to sequence, in an integration sequence, the collector code module to call the known API, and a forwarder code module to forward a data output of the service to a consumer application;

program instructions to determine that a second information about a second API of a second service is unavailable to identify the second API;

program instructions to obtain a previously produced data output of the second service;

program instructions to parse the previously produced data output to identify a data component;

program instructions to determine a transformation that is applied to a data item to obtain the data component, the data item being stored in a system that is integrated with the service;

program instructions to create, according to the transformation, a mapping between the data item and the data component, such that the mapping when applied to the data item results in the data component;

program instructions to apply the mapping to an actual data item to obtain an actual data component of an actual data output of the second service;

program instructions to emulate the actual data output of the second service using the actual data component;

program instructions to forward the emulated actual data output to the consumer application;

program instructions to sequence, in a second integration sequence, the collector code module to parse the previously produced data output, a transformation code module to generate the mapping, and the forwarder code module to forward an emulated actual data output to the consumer application;

program instructions to determine that the pattern matches a version of the stored pattern, wherein the repository stores a plurality of versions of the stored pattern, wherein different versions of the stored pattern in the plurality of versions correspond to different implementations of the known API; and program instructions to further conclude that the API of the service is a particular implementation of the known API, the particular implementation of the known API corresponding to the version of the matching stored pattern.

9. The computer program product of claim 8, further comprising:

program instructions to determine that the data component is generated due to a variation in the service from a standard service; and program instructions to further conclude that the service is a particular implementation of the standard service; and program instructions to use the variation in the service to produce the emulated actual data output.

10. The computer program product of claim 8, further comprising: program instructions to sequence, in the integration sequence, a metric code module to compute a performance metric, wherein the performance metric represents an accuracy in identifying the API of the service.

11. The computer program product of claim 8, wherein the repository comprises a set of stored patterns, each stored pattern corresponding to an API that is known from a previous system integration.

12. A computer system for systems integration, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to parse an information published about an application programming interface (API) of a service to extract a pattern from the information;

program instructions to compare the pattern with a stored pattern in a repository, wherein the stored pattern corresponds to a known API;

program instructions to conclude, responsive to the pattern matching the stored pattern within a threshold degree of match, that the API of the service is the known API;

program instructions to select a collector code module, the collector code module being configured to call the known API;

program instructions to sequence, in an integration sequence, the collector code module to call the known API, and a forwarder code module to forward a data output of the service to a consumer application;

program instructions to determine that a second information about a second API of a second service is unavailable to identify the second API;

program instructions to obtain a previously produced data output of the second service;

program instructions to parse the previously produced data output to identify a data component;

program instructions to determine a transformation that is applied to a data item to obtain the data component, the data item being stored in a system that is integrated with the service;

program instructions to create, according to the transformation, a mapping between the data item and the data component, such that the mapping when applied to the data item results in the data component;

program instructions to apply the mapping to an actual data item to obtain an actual data component of an actual data output of the second service;

program instructions to emulate the actual data output of the second service using the actual data component;

program instructions to forward the emulated actual data output to the consumer application;

program instructions to sequence, in a second integration sequence, the collector code module to parse the previously produced data output, a transformation code module to generate the mapping, and the forwarder code module to forward an emulated actual data output to the consumer application;

program instructions to determine that the pattern matches a version of the stored pattern, wherein the repository stores a plurality of versions of the stored pattern, wherein different versions of the stored pattern in the plurality of versions correspond to different implementations of the known API; and program instructions to further conclude that the API of the service is a particular implementation of the known API, the particular implementation of the known API corresponding to the version of the matching stored pattern.

\* \* \* \* \*